US007813712B2

(12) United States Patent
Yasuoka et al.

(10) Patent No.: US 7,813,712 B2
(45) Date of Patent: Oct. 12, 2010

(54) ELECTRONIC DEVICE HAVING METAL OUTER CASE AND ANTENNA THEREIN

(75) Inventors: Tadashi Yasuoka, Tokyo (JP); Akinari Takada, Tokyo (JP); Ienobu Ikeda, Tokyo (JP); Takashi Ihara, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 1031 days.

(21) Appl. No.: 11/578,080

(22) PCT Filed: Aug. 25, 2005

(86) PCT No.: PCT/JP2005/015961

§ 371 (c)(1),
(2), (4) Date: Oct. 12, 2006

(87) PCT Pub. No.: WO2006/022433

PCT Pub. Date: Mar. 2, 2006

(65) Prior Publication Data

US 2008/0293373 A1 Nov. 27, 2008

(30) Foreign Application Priority Data

Aug. 25, 2004 (JP) ............................ 2004-244800

(51) Int. Cl.
*H04B 1/08* (2006.01)

(52) U.S. Cl. ................. 455/347; 455/550.1; 455/575.7; 368/47

(58) Field of Classification Search ................. 455/347, 455/550.1, 575.1, 575.7; 368/47
See application file for complete search history.

(56) References Cited

U.S. PATENT DOCUMENTS 5,331,608 A 7/1994 Umemoto et al.
5,696,518 A 12/1997 Itoh et al.
6,134,188 A 10/2000 Ganter et al.
6,411,569 B1 6/2002 Megner et al.

(Continued)

FOREIGN PATENT DOCUMENTS

EP 0 382 130 8/1990

(Continued)

*Primary Examiner*—Nhan Le
(74) *Attorney, Agent, or Firm*—Greer, Burns & Crain, Ltd.

(57) ABSTRACT

With the object of providing an electronic device having good radio signal receiving characteristics with a metal outer case housing therewithin an antenna section without restrictions imposed with regard to material or design, an electronic device minimally having an antenna section 32, an information processing means 33 for processing information that is captured by the antenna section 32, and a metal outer case 31, which houses therewithin the antenna section 32 and the information processing means 33, wherein the metal outer case is configured so that the antenna section 32 can receive magnetic flux from outside via the metal outer case 31 and can resonate, the metal outer case 31 minimally comprising a metal case body member 45 and a metal caseback member 41, and wherein a joining and fixing portion 400 between the metal case body member 45 and the metal caseback member 41 is not provided at a location or in the vicinity of at least a location opposite the substantially center part of the antenna section 32.

9 Claims, 14 Drawing Sheets

U.S. PATENT DOCUMENTS

| | | | | |
|---|---|---|---|---|
| 6,825,751 | B1 * | 11/2004 | Kita et al. | 340/5.61 |
| 7,088,249 | B2 | 8/2006 | Senba et al. | |
| 7,190,638 | B2 * | 3/2007 | Oguchi | 368/47 |
| 2005/0146472 | A1 | 7/2005 | Ihara et al. | |
| 2006/0126438 | A1 * | 6/2006 | Itou et al. | 368/47 |

FOREIGN PATENT DOCUMENTS

| | | |
|---|---|---|
| JP | 57-131042 | 2/1981 |
| JP | 61-203516 | 12/1986 |
| JP | 2-126408 | 10/1990 |
| JP | 5-81787 | 11/1993 |
| JP | 06-215942 | 8/1994 |
| JP | 10-197662 | 7/1998 |
| JP | 11-64547 | 3/1999 |
| JP | 11-074138 | 3/1999 |
| JP | 11-304973 | 11/1999 |
| JP | 2000-105285 | 4/2000 |
| JP | 2001-030524 | 2/2001 |
| JP | 2001-33571 | 2/2001 |
| JP | 2001-208875 | 8/2001 |
| JP | 2001-264463 | 9/2001 |
| JP | 2002-118490 | 4/2002 |
| JP | 2002-184637 | 6/2002 |
| JP | 2004-125659 | 4/2004 |
| JP | 2004-144481 | 5/2004 |
| WO | WO 95/27928 | 10/1995 |

* cited by examiner (A)

(B)

(A)

(B)

ELECTRONIC DEVICE HAVING METAL OUTER CASE AND ANTENNA THEREIN

BACKGROUND OF THE INVENTION

1. Field of the Invention

The present invention relates to an electronic device that receives a radio signal transmitting prescribed information, including time information, and simultaneously displays or notifies prescribed information together with time information, and which has a function of performing correction of the time information to the precise time, and more particularly to an electronic device directed at improving the radio signal receiving performance in the case of using an outer case such as a metal case.

More specifically, the present invention relates to an electronic device configured so that the radio signal receiving performance of an antenna section does not deteriorate, even in the case which a resonance antenna section antenna is disposed within a metal outer case.

2. Background Art

In recent years, in electronic devices, including watches, mobile telephones, and radio communication equipments which receive a standard radio signal having a long wavelength that includes a time code, many electronic devices have been developed as products that have a radio signal correction function that automatically corrects the time of the clock circuit provided in the electronic device to the standard time.

With regard to a time piece as a specific example of such an electronic device, it is widely known that the methods of displaying the time in the past could be broadly classified into that of using two or three hands to display the time in analog type, that of digitally displaying the time using an electro-optical display device such as liquid crystal or LEDs, and that of using combination of both.

Of these, even among such an analog type of timepiece, it is also well-known that a user can select according to his or her individual tastes, a timepiece for example with or without such secondary time counting function such as a second hand or calendar, or with or without a timer function, chronograph function or alarm function, age of the moon display function or the like.

Also, although in electronic timepieces in the past the accuracy of the time display was almost always dependent on the accuracy of circuit blocks mainly comprising a quartz oscillator that is incorporated within the watch movement, in recent years, accompanying the coming on line of standard time signal transmitting facilities in various countries, watches (hereinafter referred to as radio controlled timepieces) having a radio signal correction function that enables automatic correction of the time by receiving a standard time radio signal from such facilities have become common.

It is possible to see a past patent application for such a radio controlled timepiece (for example, this can be seen in the Japanese examined patent publication No. 11-304973 or the Japanese un-examined patent publication No. 2001-33571).

In general, in a radio controlled timepiece, because the error of the timekeeping internal counter within the timepiece itself is automatically corrected by receiving a standard time radio signal, when in an environment in which reception of a radio signal is possible, it is possible to make the time display error extremely close to zero. The standard time radio signal has a frequency and data format that is pre-established by the transmitting facility, and at present in addition to Japan, this is transmitted in countries such as Germany and the US, and many radio controlled timepiece are produced in those countries. Also, in order for the radio signals used by current radio controlled timepieces to be able to cover a broad area with only limited transmitting facilities, they use longwaves. Also, in order to avoid interference in border regions, two stations having different frequencies of 40 kHz and 60 kHz generate the standard time radio signals of Japan.

The problems in the prior art are described below, taking the example of a radio controlled timepiece of the past, which is a typical electronic device.

Specifically, as noted above, a radio controlled timepiece that receives a standard radio signal receives a standard radio signal (carrier wave) that includes time information and extracts time information from the radio signal, so as to obtain the precise time is already known. The frequencies of radio signals that include this time information are different, depending upon the country, for example, in Japan as noted above, under the jurisdiction of the Ministry of Internal Affairs and Communications and the Postal Service Agency, standard radio signals are transmitted at 40 kHz and 60 kHz.

FIG. 2 is a block diagram showing the general functions in a specific example in such a radio controlled timepiece. This radio controlled timepiece is formed by an antenna 1, a radio controlled timepiece receiver 2, a CPU 3, a display driver section 4, and an input device 5 and the like. In addition, although not shown in the drawing, a display section using hour, minute, and second hands or a liquid crystal or the like is included.

In this radio controlled timepiece, first, the antenna 1 receives a radio signal including time information, and the radio controlled timepiece receiver 2 amplifies and detects the radio signal received by the antenna 1 and extracts and outputs the time information from the radio signal. The CPU 3 outputs the current time information on the time information output from the radio controlled timepiece receiver 2. The display drive section 4, based on the current time information output from the CPU 3, causes display of the current time on the display section. Also, the input device 5 is used when inputting operating information such as resetting to the CPU 3.

The time information (time code) including in the radio signal is a pulse signal with a period of 60 seconds, and although this differs between countries, in the case of Japan a pulse having a width either one of 200, 500, or 800 ms is superimposed in every 1 second. By the combination of these pulses, the time information is obtained in 60 seconds. The CPU 3, by reading the pulse width of the pulses occurring every 1 second from the received pulse signal, obtains the time information (current time). The CPU, by the obtained time information, corrects the time displayed by the display section via the display drive section 4. By doing this, the radio controlled timepiece, by correcting the displayed time at every prescribe time interval based on the received time information, displays the precise time at all times.

A wristwatch in which an antenna, a CPU, a radio wave receiver, a display driver section and a display section are housed within a case which is a housing member for housing the antenna thereinside are already available as a radio controlled timepiece. The case material used is generally made of a non-conducting material such as a synthetic resin or ceramic, in order that the antenna receives a radio signal. This is because if the antenna is housed in a case made of a conductive material such as metal or the like, the magnetic flux generated in the vicinity of the antenna is absorbed by the conductive material, thereby preventing resonance, so that there is a significant deterioration in the receiving performance of the antenna.

The general configuration of another specific example of an analog-type radio controlled timepiece of the past is shown in FIG. 3.

Specifically, in FIG. 3 100 is an antenna section that receives a radio signal, 102 is a watch movement that drives hands, 103 is an outer case that houses the watch movement 102 and the antenna section 100, 104 is a caseback member, 105 is a dial plate that has scales that indicate the time, and 106 is a windshield.

In FIG. 3, the antenna section 100 is formed by an antenna core section 101*a* having a high permeability, such as ferrite or an amorphous alloy, and an antenna coil section 101*b*, which is wound around the antenna core section 101*a*, and which is housed together with the watch movement 102 within the closed space 107 formed by the outer case 103, the caseback member 104, and the dial plate 105.

In this timepiece, when radio waves 109 that strike and pass through the outer case 103 pass through the antenna core section 101*a*, a current is generated in the antenna coil section 101*b*.

The ends of the coil of the antenna coil section 101*b* are electrically coupled to a circuit block, which is not illustrated, that is a constituent part of the watch movement 102, and the current generated in the antenna coil section 101*b* is sent to the circuit block through this coupling section. The current that is sent to the circuit block resonates at a pre-determined frequency, which is, the frequency of the standard time radio signal, is filtered by a quartz crystal, which is not illustrated, and is passed through a decoding circuit, which is not shown, so as to extract only the time information.

In this case, the watch movement 102 has a time-keeping counter within the circuit system that is separate from the above-noted time information. The watch movement 102 compares the time according to this time-keeping counter with the filtered time information and, in the case in which the respective results are different, outputs a hand correction command to a motor block, which is not illustrated, so as to correct the hands to comply with the time information obtained from the standard time radio wave by driving the motor. By doing this, the time information displayed by the timepiece is automatically corrected to the corrected time when the standard time radio signal was received.

However, in FIG. 3, the antenna section 100 and the watch movement 102 are housed within a closed space 107 formed by the outer case 103, the caseback member 104, and the dial plate 105, and it is necessary for the antenna section 100 to receive the radio signal 109 within this closed space 107.

For this reason, in FIG. 3 the outer case 103 and the caseback member 104 are formed of materials that have small eddy current loss, such as a high molecular polymer resin. By doing this, the radio signal 109, can reach the antenna section 100 housed within the closed space 107 without being attenuated by the outer case 103 and the caseback member 104.

However, in the case in which the outer case 103 is formed of a high molecular polymer resin, there is a great sacrifice in terms of rigidity in comparison with metal, for example, with stainless steel or titanium, that is generally used in watches. For this reason, in order to prevent damage to a timepiece, which is for example, the timepiece is broken by a shock when it is dropped, it is necessary to make the thickness of the outer case 103 and the bottom caseback member 104 greater than in the case of metal, and this results in the problem of the timepiece itself becoming large.

Also, in the case of forming the outer case 103 and the caseback member 104 of a high molecular polymer resin, there is the problem of a great sacrifice in massive feeling in comparison with metal. Although a high molecular polymer resin can be surface treated to attain a metallic luster, it still suffers in terms of the luster and massive feeling in comparison with metal.

In contrast, for example as shown in FIG. 3, there are timepieces in use in which the dial plate 105, that is the bezel 111 only, which the user can directly see, is made of metal and a side portion of the outer case 103 and the caseback member 104 are made of high molecular polymer resin, although in comparison with the usual timepiece having a metal outer case, the overall thickness of the timepiece is large. There is also a suffering in terms of the massive feeling of the product.

In the case of a high molecular polymer resin, for example when the caseback member 104 is fitted, there is a tendency for plastic deformation to occur, this representing a watertightness problem in the connecting region between the caseback member 104 and a case body member as the outer case 103, making it impossible to have a highly waterproof diver's type timepiece in the product line.

In contrast to this, although there are usable products in which the outer case and the caseback member are formed of a non-metallic material other than high molecular polymer resin, or ceramics, sintering is required in order to maintain the rigidity of ceramics, and because of the problems of not being able to achieve precision processing after sintering or of not being polished when it is textured with a complicated configuration, there is the great problem of a restriction in the outer case design. Also, because ceramics are brittle materials, they are susceptible to splitting and chipping when subjected to shock.

If a synthetic resin case is used in order to avoid antenna reception problems, not only does this lead to a reduction in the resistance of the case to damage and chemicals, but also it leads to a loss of the feeling of high quality and beauty that is required wristwatch that is an item of accessory. For this reason, there has been proposed a radio controlled timepiece that uses metal for the case.

FIG. 4 shows a past example of a radio controlled timepiece using a metal case. FIG. 4 is a plan view of a past example, in which the same numbers have been assigned to constituent elements that correspond to elements in FIG. 3, the descriptions of which have been omitted.

As shown in FIG. 4, a timepiece having the following configuration has also been practically used in that the outer case 103 and the caseback member (not illustrated) are formed of metal, and a high molecular polymer resin antenna case 110 is attached at a part that does not overlap with the outer case 103 and the caseback member when viewed from above, and an antenna section 100 being housed within it is connected to the watch movement 102 therewithin in this product. In the case of this product, because the antenna section 100 is disposed outside the closed space 107 formed by the outer case 103, the caseback member, and the dial plate 105, the radio waves traveling toward the antenna section 100 is not influenced by the metal material represented by the outer case 103, so that it is possible to receive the radio wave signal 109 by the antenna section 100.

In this case, however, the shape of the finished timepiece is extremely special, thereby leading to the problem of a great restriction in the design of the finished timepiece. Also, because there is a great difference in massive feeling between the outer case 103 and the high molecular polymer resin antenna case 110 in which the antenna is housed, it is difficult to accommodate this in the design, thereby creating the problem of it being difficult to be accepted by a user.

FIG. 5 is a cross-sectional view showing an example of the structure of a radio controlled timepiece using metal for part of the case. This wristwatch 10 is generally formed by a case body member 11, a caseback member 12, and wind shield made of glass 13. A watch movement 14 is disposed inside the case body to which a band (not illustrated) is attached using a known means. At the top of the watch movement 14 are attached a dial plate 15 and hands 16 that serves as a time display section are attached by a known means. At the bottom of the watch movement 14 and also at a position that is above the caseback member 12, is disposed a bar antenna 17 that is a magnetic longwave antenna. This bar antenna 17 is formed by a magnetic core member 18 and a coil 20 that is wound on the magnetic core member 18, and is fixed to the upper surface of a holding member made of synthetic resin.

The watch movement 14 has the above-described radio wave receiver, a CPU, and a display drive section, and is electrically connected to the bar antenna 17 by connection leads 21. Therefore, based on a standard radio signal received by the bar antenna 17, the CPU of the watch movement 14 causes a gear mechanism, which is not illustrated, in the display drive section to be driven so as to continuously correct the position of the hands 16 of the watch movement 14. In this case the up/down directions are the up/down directions shown in FIG. 5.

The case body member 11 is a non-hollow conductive material, that is, for example a solid metal such as stainless steel. At the upper part of the case body member 11, a wind shield 13 made of glass which is a non-conductive material, is fixed by a known means such as an adhesive. The dial plate 15 is made of a synthetic resin or ceramic, which is a non-conductive material.

The caseback member 12 is formed by an annular bezel 22, which is made of stainless steel and fixed to the case body member 11, and a windshield 23 that is fixed within the bezel. In this manner, although it is possible to view non-conductive materials at the top and bottom surfaces of this wristwatch, because the side part of the case is made of metal, there is the advantage of not sacrificing the appearance of high quality and beauty as an accessory (refer to, for example, the above-described Japanese unexamined patent publication No. 2001-33571).

Specifically, as adopted in the Japanese unexamined patent publication No. 2001-33571, in the case of using a non-metallic material as typified by high polymer resin, glass, or ceramics as the caseback member, there is the above-noted advantage, although when selecting the material there are many limitations, and there are many problems such as difficulty in manufacturing, and a loss of attractiveness as a finished product, making it desirable to make the caseback member of metal.

Because of these reasons, when developing a radio controlled timepiece in the past, there were great restrictions in the material of the outer case, and it was very difficult to achieve a compact finished product.

In the case of a radio controlled timepiece, it has been thought that the antenna characteristics and the receiving circuit characteristics determine the receiving performance.

That is, according common technological knowledge of the past, the lower limit of the input signal to be received by a receiving circuit or the receiving IC, was practically a signal amplitude of approximately 1 μV and, in order to achieve practically useful receiving performance, it was necessary for a receiving antenna to obtain an output having a signal amplitude of approximately 1 μV with an antenna in an electrical field strength (strength of the radio waves) of 40 to 50 dBμV/m.

For this reason, in the case of a size restriction, a resonant-type receiving antenna, which enables the achievement of a large signal output, is generally used.

Because the radio signal wavelength is long, the type of receiving antenna generally used is a bar antenna, which has a coil wound around a magnetic core.

With this type of receiving antenna, because the output of the receiving antenna is approximately proportional to the size of the receiving antenna, it is not possible to make to antenna too small in order to obtain practically usable receiving performance, so that there are problems of receiving performance and positioning in the case of a compact timepiece such as a wristwatch.

Also, when the antenna is placed in a metal outer case, the receiving antenna output drops drastically.

For this reason, in order to use a radio signal in a wristwatch, it is not only necessary to use a design and components that are completely different from watches in the past, but also to consider the issue of not hindering receiving performance.

In wristwatch compactness, thinness, easy of portability, freedom in design, and massive feeling (feeling of high quality) are important problems, and there is a desire for a timepiece having a metal outer case housing a built-in antenna.

In the case of a radio controlled timepiece of the past, as described above the mounting of the antenna was generally either made outside or inside.

In the case in which the caseback member and outer case of a wristwatch are made of metal, the receiving antenna is generally mounted externally.

In this case, because the case of the receiving antenna is made of a non-metal material such as plastic or the like, in order so as to not lower the receiving performance, it protrudes greatly, thereby not only sacrificing compactness, thinness, and portability, but also greatly lowering freedom of design.

Also, in the case of an internal receiving antenna, although ceramic or plastic is used as a material for the outer case (caseback member and outer case) in order to not reduce the receiving performance, because these materials have little strength, the thickness thereof increases, thereby causing a loss of housing capacity and portability, and also greatly restricting design.

Additionally, the result is a wristwatch that has a poor external appearance having low massive feeling.

For this reason, in the past, for example as can be seen in Japanese Unexamined Utility Model publication No. 2-126408, a metal antenna has been disposed within a leather band of the wristwatch.

Also, as disclosed in Japanese Unexamined Utility Model publication No. 5-81787 filed by the applicant of this patent application, there an instance in which an antenna in which a coil is wound around a core is disposed between the dial plate and the windshield, which distances it from the metallic case itself that would interfere with the radio waves and also provides a unique design, and in international patent publication WO95/27928, there is the disclosure of the mounting of an antenna on the side part of a watch case of a wristwatch.

Additionally, in European patent publication No. 0382130, there is a disclosure of the disposition of an antenna for example on the top part of a case in a ring shape.

However, in a configuration in which the antenna is disposed in the band, because the antenna exists inside the band, it is necessary to make electrical connection with a main case body member of the electronic device, and it is not possible to impart sufficient flexibility to the connection part between the two.

Additionally, it is not possible to use a band of metal, which would interfere with radio waves, and it is necessary to use a band of rubber or the like, this presenting a restriction in terms of materials and design.

Further in a configuration in which the antenna is mounted on the upper surface or side surface of the wristwatch, because the antenna is at a distance from the metal part of the wristwatch itself, there is an increase in the thickness or size of the overall watch, thereby causing a problem of a design restriction.

Additionally, in the instance in European patent publication No. 0382130, in which the antenna is disposed in a ring shape on the upper surface of the case, because reception is not possible if metal exists within the ring, there is the problem of the practical necessity to provide antenna that is separate from the wristwatch.

Additionally, although in Japanese unexamined patent publication No. 11-64547 there is a disclosure of a wristwatch in which a coil is disposed in a channel-shaped depression provided around the periphery of a circuit board and in which a core is disposed in a curve along the circumferential direction of the circuit board, it makes the manufacturing process complex, an operation in the assembly process in the manufacturing process is also complex leading it troublesome.

In the Japanese unexamined patent publication No. 2001-33571 or Japanese unexamined patent publication No. 2001-30524 and the like, there is disclosures of a wristwatch in which the wind shield and the caseback member are made of a non-metallic material such as glass or ceramic or the like, and a metal material as in the past is used therebetween so that sufficient radio waves reach the antenna.

In the Japanese unexamined patent publication No. 2001-208875, there is a disclosure of technology related to an identification tag for a wristwatch, and the basic technical constitution of the system thereof is one in which, when boarding a ski lift at a skiing area or the like, an identification tag is provided in a wristwatch worn by a user, and an identification means provided at the ski lift gate performs information exchange to identify whether or not the user is an authorized passenger.

However, in the basic technical concept of this disclosure, a strong radio signal with high frequency is sent from the identification means and, by bringing the wristwatch having the identification tag into proximity therewith, an IC circuit within the wristwatch is activated so that the identification tag information is read by the identification means.

Essentially, in this disclosure when the high-frequency radio signal is received by an antenna provided within the watch, resonance occurs within the IC circuit in the wristwatch and electromotive force is received by the IC circuit as a result, so that IC circuit is activated thereby the identification tag information in the watch is read out so as to provide a wireless notification to the identification means.

In this disclosure, therefore, although there is teaching of operating an antenna provided within a watch and exchanging the above-noted information even in the case of the wristwatch having a metal outer case, clearly different technical concepts from the subject application are the providing of an identification means that generates a strong high-frequency radio signal, the necessity to bring the watch having the identification tag into proximity of the identification means, and the necessity, in order to sufficiently receive the high-frequency radio waves generated from the identification means, for internally provided antenna basically to be a bar antenna and also be as thin and large as possible within the watch, making it necessary to use a square antenna that is thin and flat, this being clearly different from the special relationship between the antenna section and the metallic outer case as noted in the present application.

In the Japanese Unexamined Utility Model publication No. 57-131042, while there is language describing a wristwatch in which an antenna is provided which uses a ring-shaped magnetic body bar antenna made of a ferromagnetic member that is C-shaped and surrounds a conducting part, this known example is related to a wristwatch with an associated radio, and the antenna is merely disposed on the outer part of the wristwatch, and it is clear that it is not provided inside a metal outer case as in the subject invention.

Additionally, in Japanese Unexamined Patent publication No. 6-215942 although there is language related to a configuration in which an inductor core is a separate member, this is directed to a chip inductor, and it is clearly a different technical field than the wristwatch antenna of the subject invention, and is intrinsically different in terms of both object and technical constitution from the subject application.

Also, in Japanese Unexamined patent publication No. 11-74138, although there is language with regard to a transformer in which the core is the combination of a U-shaped member and an I-shaped member, in which a secondary coil is wound around the U-shaped member, this is directed at a high-voltage transformer and it is clearly different technical field from the wristwatch antenna of the subject invention, and is intrinsically different in terms of both object and technical constitution from the subject application.

In the same manner, in Japanese Unexamined utility model publication No. 61-203516, while there is disclosure of a structure in which the abutting face of a core is caused to be inclined with respect to the direction that is perpendicular to the magnetic path, it is clearly a different technical field than the wristwatch antenna of the subject invention, and is intrinsically different in terms of both object and technical constitution from the subject application.

Also, in the Japanese Unexamined patent publication No. 2002-184637 although there can be seen language regarding tapering the gap or changing the surface area of the gap of a core of a coil, it is clearly different technical field from the wristwatch antenna of the subject invention, and is intrinsically different in terms of both object and technical constitution from the subject application.

Additionally, although in this disclosure there is language regarding a configuration of an inductor core made by a separate member, this is related to a high-voltage transformer or chip inductor, and is clearly a different technical field than the wristwatch antenna of the subject invention, and is intrinsically different in terms of both object and technical constitution from the subject application.

Specifically, in the above-noted prior example, the output of the receiving antenna is based on a decrease that occurs when housing is done in a metal outer case, and the object is to make the material of the caseback member non-metallic so as to reduce the drop in output and use sides of a metal that has a high massive feeling.

In the above-noted prior example, however, because glass or ceramic is used, there is the problem that the thickness of the wristwatch increases.

In the past, therefore, because either a large high-sensitivity antenna structure was used or usage was limited to an area in which the radio signal field strength was high, in addition to the loss of usability in a radio controlled timepiece, the manufacturing cost of the antenna structure, including the design, inevitably became high.

Furthermore, in a wristwatch having this configuration, although it was possible to achieve a radio signal that reached the antenna, and the caseback member was thinly plated with a metallic plating so as to give the user the impression that metal was actually being used, in terms of outer appearance, there was no feeling of weightiness or massive feeling, so that the high-quality image was lost.

In addition, because the antenna was incorporated inside the metal sides, the output of the antenna dropped and receiving performance decreased.

For this reason, in the past there were actually no radio controlled timepieces with a full metal case having a high quality feeling.

In addition, in Japanese Unexamined Patent Publication No. 2004-125659, while there is language regarding a radio controlled timepiece in which, in disposing an antenna section within a metal outer case, the antenna section is disposed at a part that is below the band attachment part within the metal outer case and in which a non-conductive part is provided between the antenna section and the band attachment part, because it is not possible to avoid an increase in size and material thickness, the value as a product remains low.

In order to solve these problems in the prior art, the applicant has already, in patent application No. 2002-297095 (Japanese Unexamined Patent Publication No. 2004-144481), identified the existence of a problem in which when an antenna is disposed within a watch housing having a metal outer case or a metal caseback member, the Q value decreases and, as a result, there is a decrease in the output from this antenna structure and a prominent decrease in receiving performance, and, in order to solve this problem, has proposed a technical constitution in which, by imparting a special structure to the antenna so that the reduction in the Q value of the antenna structure is minimized, thereby a reduction in the receiving performance of the antenna is suppressed.

However, because it was discovered that, in the method of specializing the structure of the above-noted antenna, there is a limit to the improvement in the receiving performance in the antenna structure, the inventors of the present invention, as a result of further study, learned that, by using a special structure in the metal outer case, including the antenna structure, there is further improvement in the above-noted problem.

DISCLOSURE OF THE INVENTION

Accordingly, in consideration of the above-noted problems in the prior art, the present invention provides an electronic device that, even in the case of using a conventional metal outer case, enables reception of a radio signal including prescribed information including time information without any trouble in carrying such an electronic device, and provides stable waterproof characteristic and an improvement of an external quality thereof having a feeling of high quality, while enabling an expansion of the same type of range of design variations as with a convention watch.

Additionally, the present invention has an object of solving the above-noted problems in the prior art, by providing an electronic device having a metal outer case housing an antenna section therewithin, and having good radio signal receiving performance, without material and design restrictions.

In the case in which the present invention is applied to a radio controlled timepiece, which is a specific example of the electronic device, in addition to the above-noted object, an object of the present invention is to provide a radio controlled timepiece that avoids an increase in the thickness of the timepiece and is attractive when worn on the wrist.

Additionally, the present invention, in the same manner as wristwatches of the past, even when using titanium or stainless steel, which have relatively high permeability, for the metal outer case and metal caseback member, provides a radio controlled time piece that maintains the same type of receiving performance as with a high molecular polymer resin or ceramic watch outer case or caseback member, and is both compact and thin.

In order to achieve the above-noted objects, the present invention has the following basic technical constitution.

Specifically, a basic aspect of the present invention is an electronic device minimally comprising an antenna section, an information processing device for processing information that is captured by the antenna section, and a metal outer case, which houses therewithin the antenna section and the information processing device, wherein the metal outer case is configured so that the antenna section can receive magnetic flux from outside via the metal outer case and can resonate, the metal outer case minimally comprising a metal case body member and a metal caseback member, and further wherein a joining and fixing portion formed between the metal case body member and the metal caseback member where both of the members being fixedly joined to each other is not provided at least at a location or in the vicinity of the location within a connecting region in which the metal case body member and the metal caseback member are closely attached to each other, and which is opposite to a substantially center part of the antenna section.

Specifically, the inventors of the present invention, as a result of further study, learned that, in an electronic device including a radio controlled timepiece in which an antenna section is housed inside a metal outer case and in the case in which a connecting region at which a caseback member and a case body member both forming a metal outer case are mutually abutted to each other is joined and fixed to each other at a several points there with a plurality of joining members in a spot like connecting manner, there is a change in the gain of the antenna section depending upon the positions of the joining and fixing portions.

Because it adopts the above-noted technical constitution, an electronic device according to the present invention, by specifying the placement positions of the joining and fixing portions, it is possible to make a further improvement in the gain of the antenna section disposed within the metal outer case comparing it with that of the past, and also possible to manufacture an electronic device that is lightweight, compact, and has thin material thickness.

BEST MODE FOR PRACTICING THE PRESENT INVENTION

Figure 6:
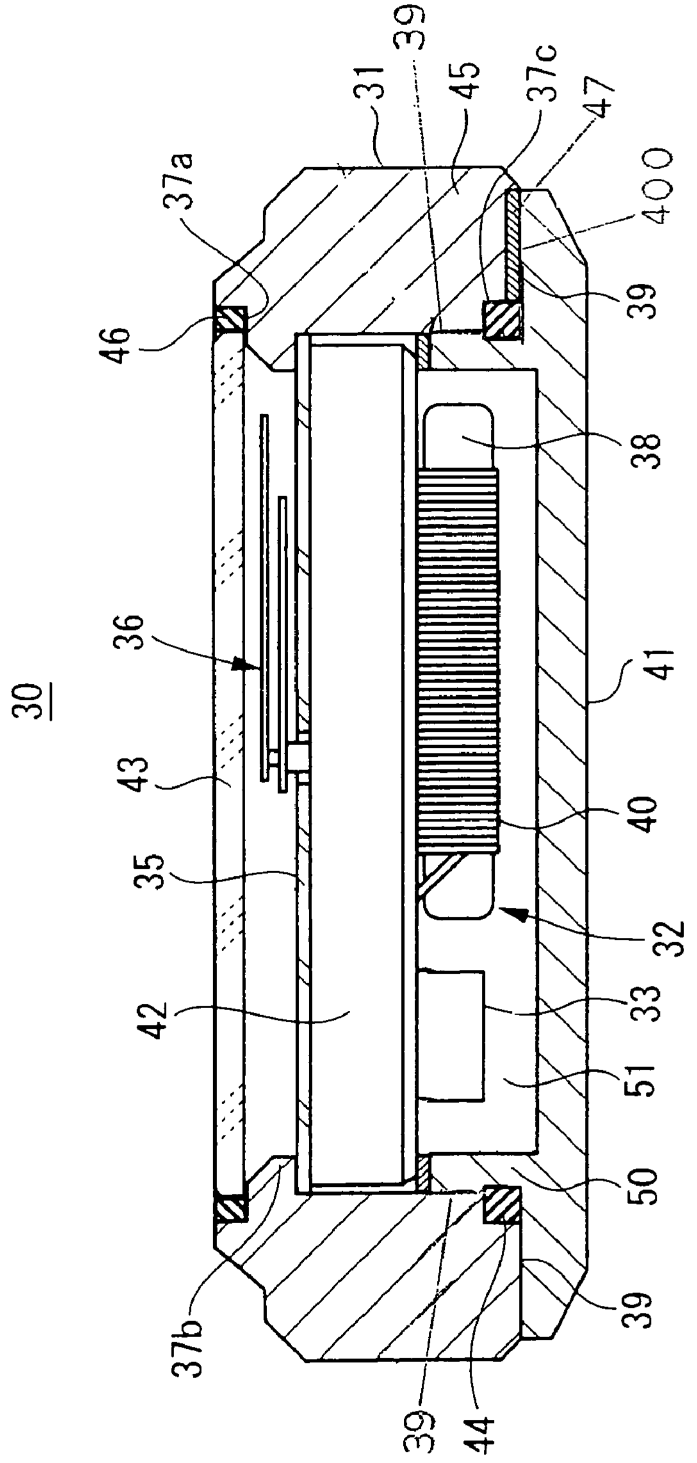
FIG. 6 is a cross-sectional view showing an example of the configuration of the connecting region between the case body member and the caseback member of the metal outer case in a radio controlled timepiece according to the present invention.

The configuration of a specific example of an electronic device according to the present invention, as shown as a radio controlled timepiece 30 having the structure as shown in FIG. 6, is described in detail below, making reference to drawings.

Figure 1:
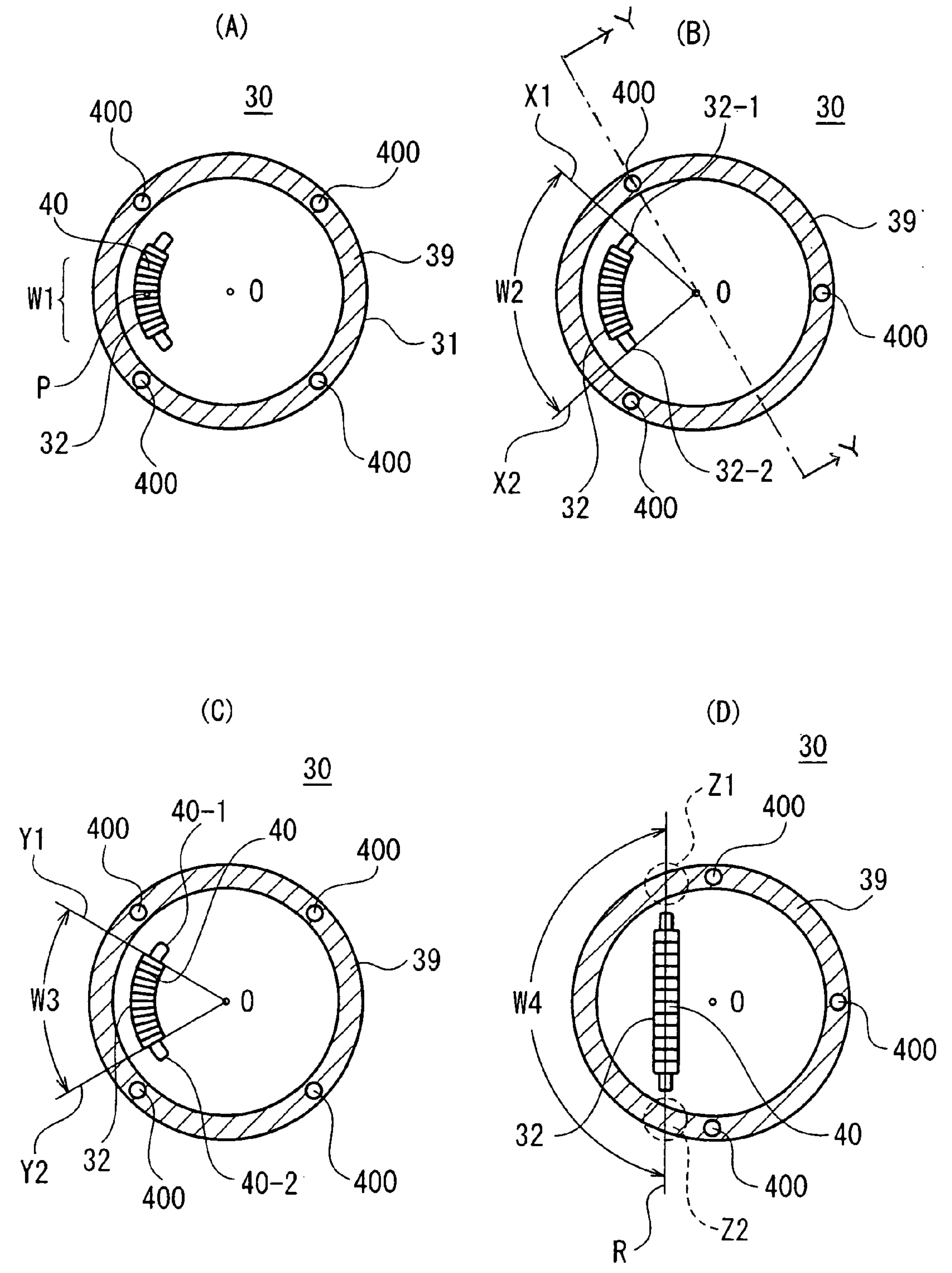
FIG. 1 is a drawing showing the configuration of a specific example of an electronic device according to the present invention.
Figure 2:
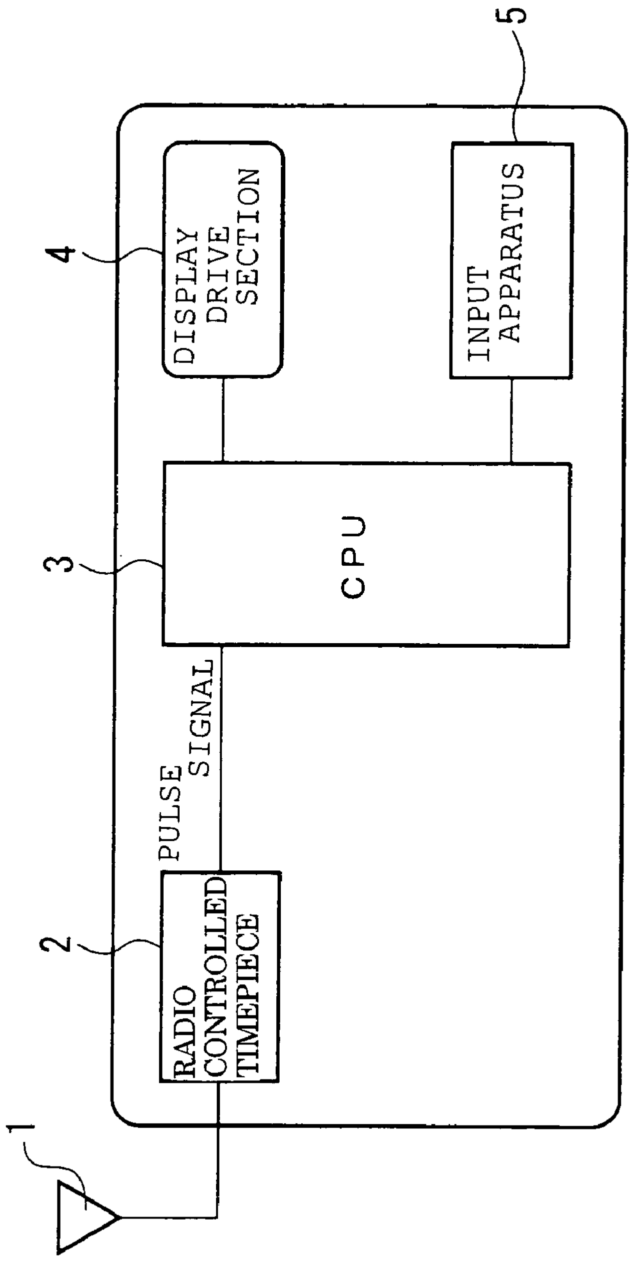
FIG. 2 is a drawing describing in general the configuration of a radio controlled timepiece as a specific example of an electronic device according to the present invention.
Figure 3:
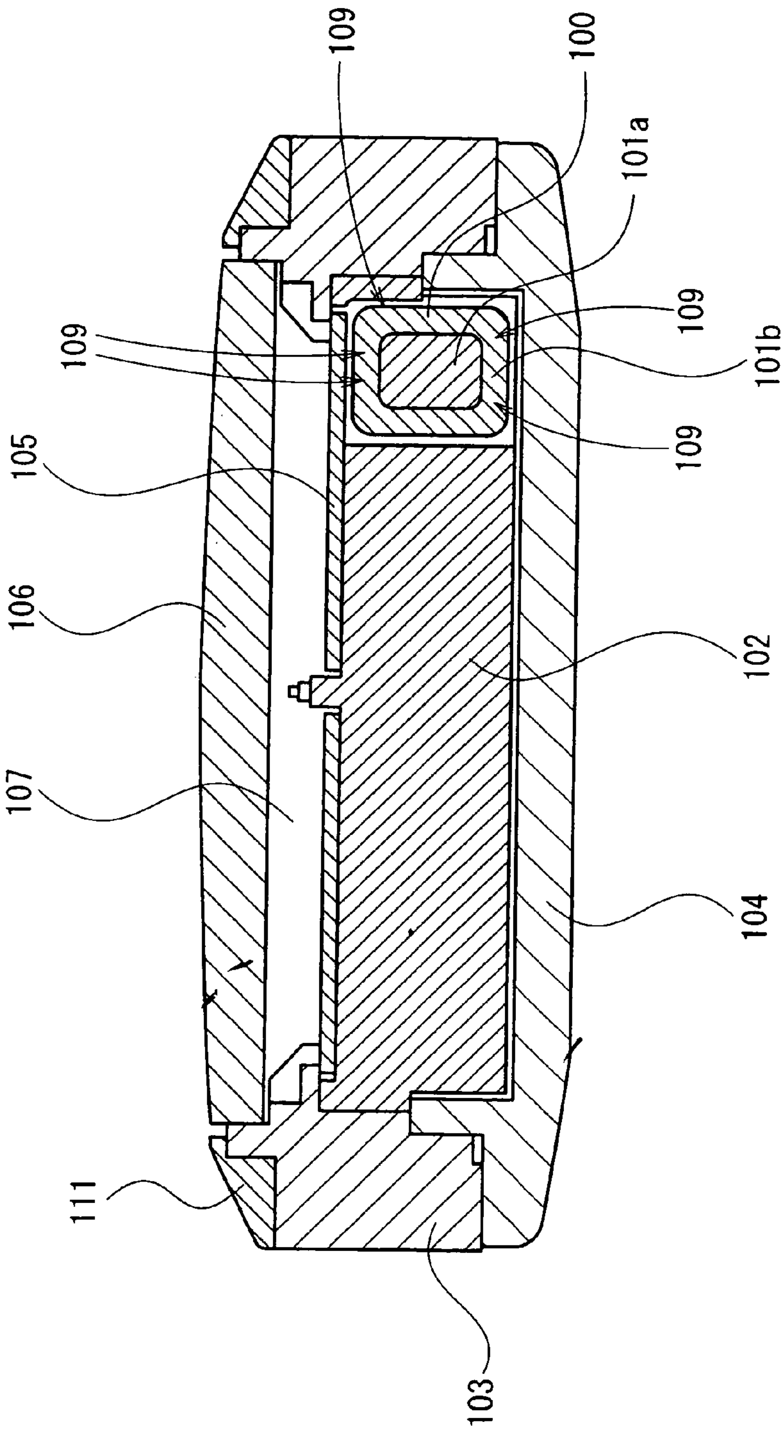
FIG. 3 is a cross-sectional view showing the general configuration of a specific example of a radio controlled timepiece of the past.
Figure 4:
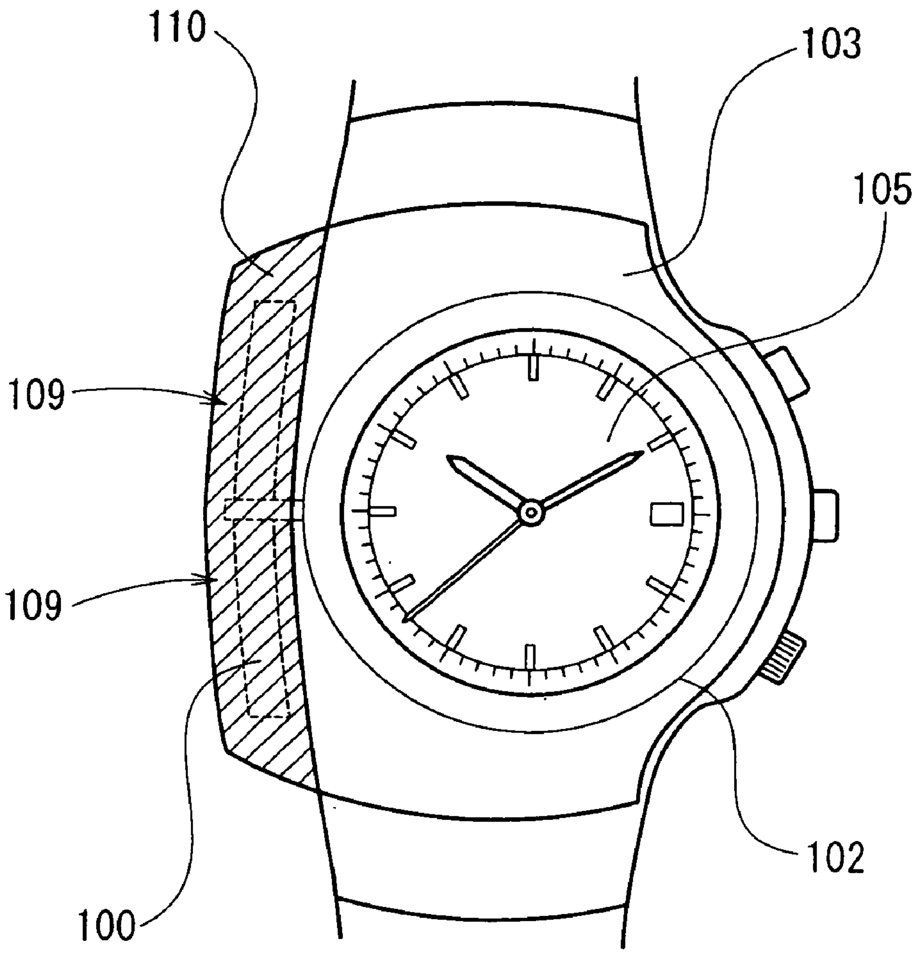
FIG. 4 is a plan view showing the general configuration of another specific example of a radio controlled timepiece of the past.
Figure 5:
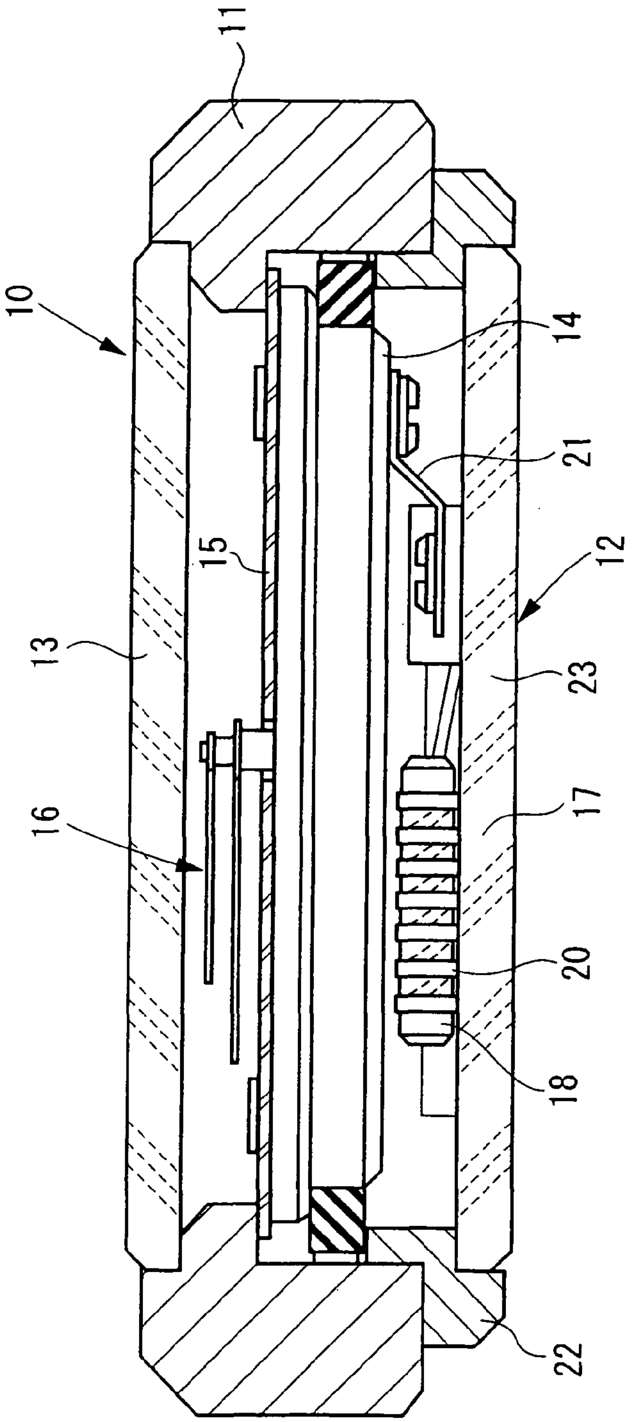
FIG. 5 is a cross-sectional view describing in detail the configuration of a radio controlled timepiece of the past.

Specifically, FIG. 1 is a drawing describing the configuration of a radio controlled timepiece, which is a specific example of an electronic device according to the present invention, and referring to FIG. 1 and FIG. 6, what is shown is a radio controlled timepiece 30 minimally having an antenna section 32, an information processing means 33 for processing information captured by the antenna section 32, and a metal outer case 31 capable of housing therewithin the antenna section 32 and the information processing means 33, wherein the metal outer case 31 is configured so that magnetic flux can be received from outside the metal outer case 31 by the antenna section 32 and can resonate, the metal outer case 31 minimally comprising a metal case body member 45 and a metal caseback member 41, and further wherein a joining and fixing portion 400 formed between the metal case body member 45 and the metal caseback member 41 where both of the members being fixedly joined to each other, is not provided at least at a location W 1 or in the vicinity of the location within a connecting region 39 in which the metal case body member 45 and the metal caseback member 41 are closely attached to each other, and which is opposite to a substantially center part P of the antenna section 32.

Furthermore, it is desirable that the antenna section 32 in the present invention be disposed in the vicinity of the outer periphery of the metal outer case 31.

An example of the configuration of the radio controlled timepiece, which is an example of the electronic device 30 of the present invention shown in FIG. 6, is generally described below.

FIG. 6 is a cross-sectional view seen along the arrow line Y-Y shown in FIG. 1 (B).

Specifically, in FIG. 6 the metal outer case 31 is formed by the case body member 45 and the caseback member 41, the case body member 45 being substantially cylindrical, a windshield made of glass 43 being mounted, via packing 46, at the step part 37*a* along the inner periphery at the aperture of the top thereof in FIG. 6, and in FIG. 6 a joining and fixing portion 400 is formed at a prescribed connecting region 39 at which there is mutually joining between the peripheral part of the caseback member 41 and the peripheral part of the case body member 45, by contacting the caseback member 41 to a bottom inner peripheral of the aperture of the case body member 45 with a joining means 47, such as utilizing a welding method, soldering method, or a solid diffusing joining method, or with a press fitting, a bosses, a screw or the like.

The caseback member 41 shown in FIG. 6 has packing 44 fitted between the rising step 50 thereof and the inner side surface 37*c* of the case body member 45.

51 is a hollow space and 33 is an information processing device such as a CPU or the like. 42 is a watch movement, 35 is a time information display means that supports hands 36.

Additionally, in this drawing the antenna section 32 is formed by an antenna coil section 40 that is wound around the magnetic core 38.

Figure 8:
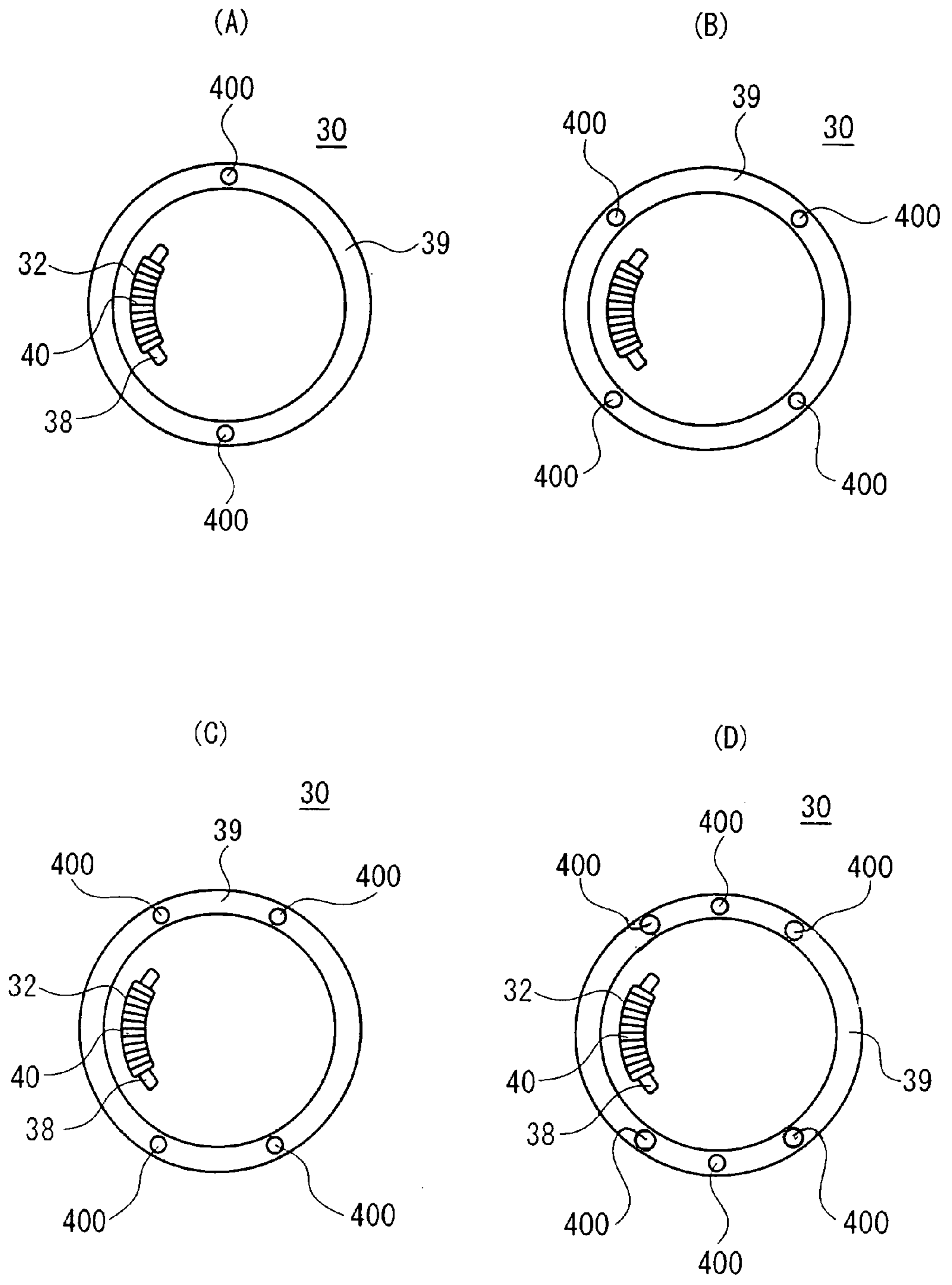
FIG. 8 is a plan view describing an embodiment of the positioning of the joining and fixing portions in a metal outer case according to the present invention.

In the radio controlled timepiece 30 of the present invention, in providing the joining and fixing portion 400 for the purpose of joining and fixing together the metal case body member 45 and the metal caseback member 41 within the connecting region 39, formed between both members 45 and 41 as shown in FIG. 8 in general from two to six joining and fixing portions 400 are discretely disposed with a substantially uniform spacing in the connecting region 39.

Figure 9:
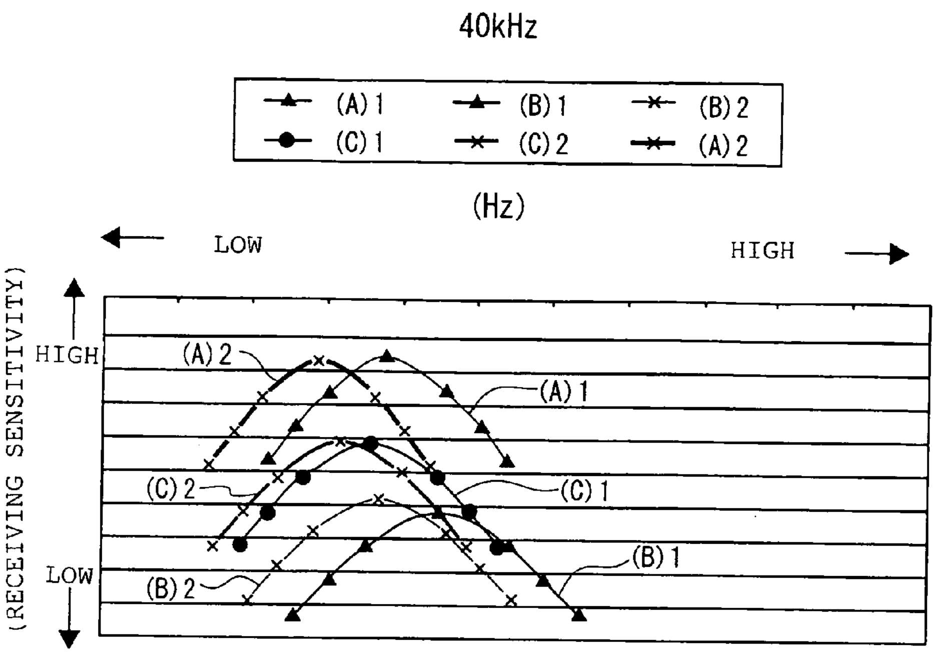
FIG. 9 shows graphs describing the effect on the gain of the antenna section in an electronic device according to the present invention.
Figure 9:
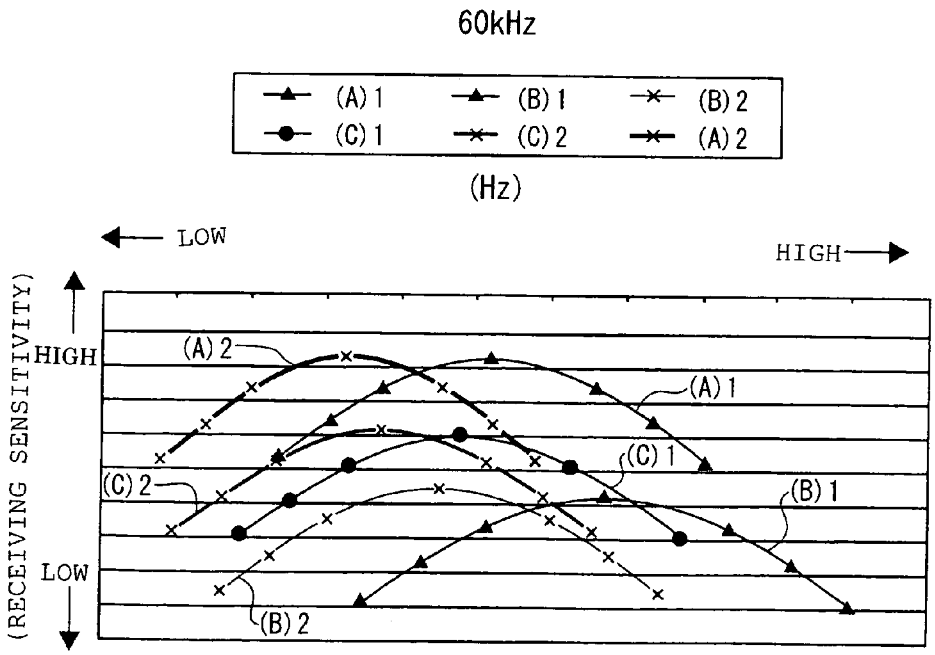

First, in accordance with the results of an experiment using the radio controlled timepiece 30 using gold (pure gold) as a metal material to form the metal outer case 31, as shown in FIG. 8 (A), when the joining and fixing portions 400 are disposed at the two locations such as at the 12 o'clock and 6 o'clock positions of the connecting region 39 formed between the case body member 45 and the caseback member 41 and the gain of the antenna portion 32 is measured the graph (A) as shown in FIG. 9 was obtained.

Although this result was the best among the results of experiments by the inventors, with the disposition configuration of the joining and fixing portion 400 such as shown in FIG. 8(A), warping or deformation occurs in the case body member 45 or caseback member 41 during use of the electronic device 30, and in addition to a decrease in waterproofness, there is the possible of a slight problem such as the intrusion of dust and the like into the metal outer case from the outside.

The inventors measured the gain of the antenna section 32 for the case of disposing the joining and fixing portions 400 at the four locations in the connecting region 39 formed between the case body member 45 and the caseback member 41 including the location opposite to the antenna section 32 as shown in FIG. 8 (B), thereby obtaining the graph (B) shown in FIG. 9.

With this configuration, it is seen that with regard to the gain of the antenna section 32 there is no problem in terms of use of the product, but there is a great decrease in the gain in comparison with the above-noted configuration.

For this reason, the inventors performed various experiments on the hypothesis that the provision of the joining and fixing portion 400 in the vicinity of the antenna section 32 would give an adverse effect on the gain of the antenna section 32, thereby arriving at the present invention. For example, if a measurement is made of the gain of the antenna section 32 in the case in which, as shown in FIG. 8 (C), the joining and fixing portions 400 in the connecting region 39 formed between the case body member 45 and the caseback member 41 are formed at four positions other than the position therein 39 opposite to the antenna section 32, the graph such as shown at (C) in FIG. 9 was obtained.

Additionally, as shown in FIG. 8 (D), if a measurement is made of the gain of the antenna section 32 in the case in which the joining and fixing portions 400 are provided at six positions in the connecting region 39 formed between the case body member 45 and the caseback member 41 other than the positions within the connecting region 39 and opposite the antenna section 32, a graph (not illustrated) similar to graph (C) of FIG. 9 is obtained.

FIG. 9 (A) shows the measurement results at 40 kHz, and FIG. 9 (B) shows the measurement results at 60 kHz, these indicating the same type of results for each case.

Essentially, considering the graphs shown in FIG. 9, it was discovered that it is possible to improve the gain of the antenna section 32 by preventing the placement of the joining and fixing portions 400 from being positioned at a position within the connecting region 39 formed between the case body member 45 and the caseback member 41 and that are opposite to the antenna section 32 when establishing the joining and fixing portions 400.

This is thought to be the case because of eddy currents that hinder the antenna resonance being generated at the connecting region in the vicinity of the antenna section 32, and particularly at the joining and fixing portions 400 in which magnetic coupling is caused, the gain of the antenna has been decreased.

If the joining and fixing portions are made at four positions, it is extremely difficult for the above-noted problems of warping and a loss of waterproof characteristic to occur. Also, even if six or more connecting regions are used, although there is still difficulty in the above-noted problems occurring, if more than six locations are used, there is an increase in the manufacturing process of the case body member and the caseback member, and fixing force becomes greater than is necessary.

Therefore, it is appropriate to use between two and six joining and fixing portions.

The inventors of the present invention, as a result of further experimentation, learned that, as shown in FIG. 1 (A), that not providing joining and fixing portions 400 at a portion in the connecting regions 39 that are opposite the center part P of the antenna section 32, that is within the part W1 in the drawing, is basic.

Additionally, the inventors of the subjection invention, learned that it is desirable, as shown in FIG. 1 (B), that the joining and fixing portions 400 formed between the metal caseback member and the metal case body member are not provided at positions within a part of the connecting region 39 in that the metal case body member 45 and the metal caseback member 41 are closely attached to each other and formed between the lines X1 and X2 which join the ends 32-1 and 32-2 of the antenna section 32 with the center point O of the electronic device 30, this being the region W2.

The inventors of the subjection invention also learned that it is desirable, as shown in FIG. 1 (C), that the joining and fixing portions 400 formed between the metal caseback member and the metal case body member are not provided at portions within a part of the connecting region 39 in that the metal case body member and the metal caseback member are closely attached to each other and formed between the lines Y1 and Y2 which join the ends 40-1 and 40-2 of the coil section 40 of the antenna section 32 with the center point O of the electronic device 30, this being the region W3.

In the present invention, the antenna section 32 is configured so as to have a magnetic core that is rod-shaped and is substantially straight or curved, with a maximum length that is smaller than the maximum diameter length of the metal outer case 31, and in the case in which an antenna section 32 is used that has a magnetic core that is rod-shaped and substantially straight, as shown in FIG. 1 (D) in this electronic device, it is desirable that, the joining and fixing portion 400 formed between the metal case body member 45 and the metal caseback member 41 where both of the members being fixedly joined to each other, is not provided at least in an area within a connecting region 39 in that the metal case body member 45 and the metal caseback member 41 are closely attached to each other, and which is formed between the interconnection portions Z1 and Z2 formed between a center axis line R of the antenna section 32 and the connecting region 39, and which is closer to the antenna section 32, that is the part W4.

The electronic device 30 of the present invention is desirably selected as one of a radio controlled timepiece, a mobile telephone, and a radio communication apparatus.

It is desirable that the joining and fixing portions 400 used in the present invention, rather than being a continuous planar shape, be discrete within the connecting region, and when seen in plan view, be spot-type locations having a small surface area and shapes that are round, rectangular, polygonal, elliptical or the like.

Additionally, it is desirable that a plurality of the joining and fixing portions 400 used in the present invention are provided at a plurality of locations within the connecting region 39 that peripherally surrounds the electronic device 30, and specifically that the number of joining and fixing portions 400 be selected from the range of two to six.

The configuration of the joining and fixing portions 400 used in the present invention is not particularly restricted, and can be adopted as a known joining and fixing method.

Specifically, for example, it is possible to join the caseback member and the case body member using one or a plurality of joining means selected from a group consisting of a screw method, an internal screw method, a fixing method using a plurality of threaded bolts, a crimping method, a packing fixing method (including GN-4 or GN-7), a boss fitting fixing method, a snap-in method, a welding method, a soldering method, a bayonet method, a solid diffusion joining method, or the like.

Of these, if the caseback member and case body members are joined by a welding method, a soldering method, or a solid diffusion joining method, it is not possible to break the joint position therebetween. In this case, as shown in FIG. 10 at least one of the case body member 45 and the caseback member 41 is formed by a plurality of constituent elements, and it is made possible to make free attachment and removal therebetween.

When doing this, it is possible to select the joining method from one or a plurality of fixing means, for example, a screw method, an internal screw method, a fixing method using a plurality of threaded bolts, a crimping method, a packing fixing method (including GN-4 or GN-7), a boss fitting fixing method, a snap-in method, a bayonet method or the like.

Figure 10:
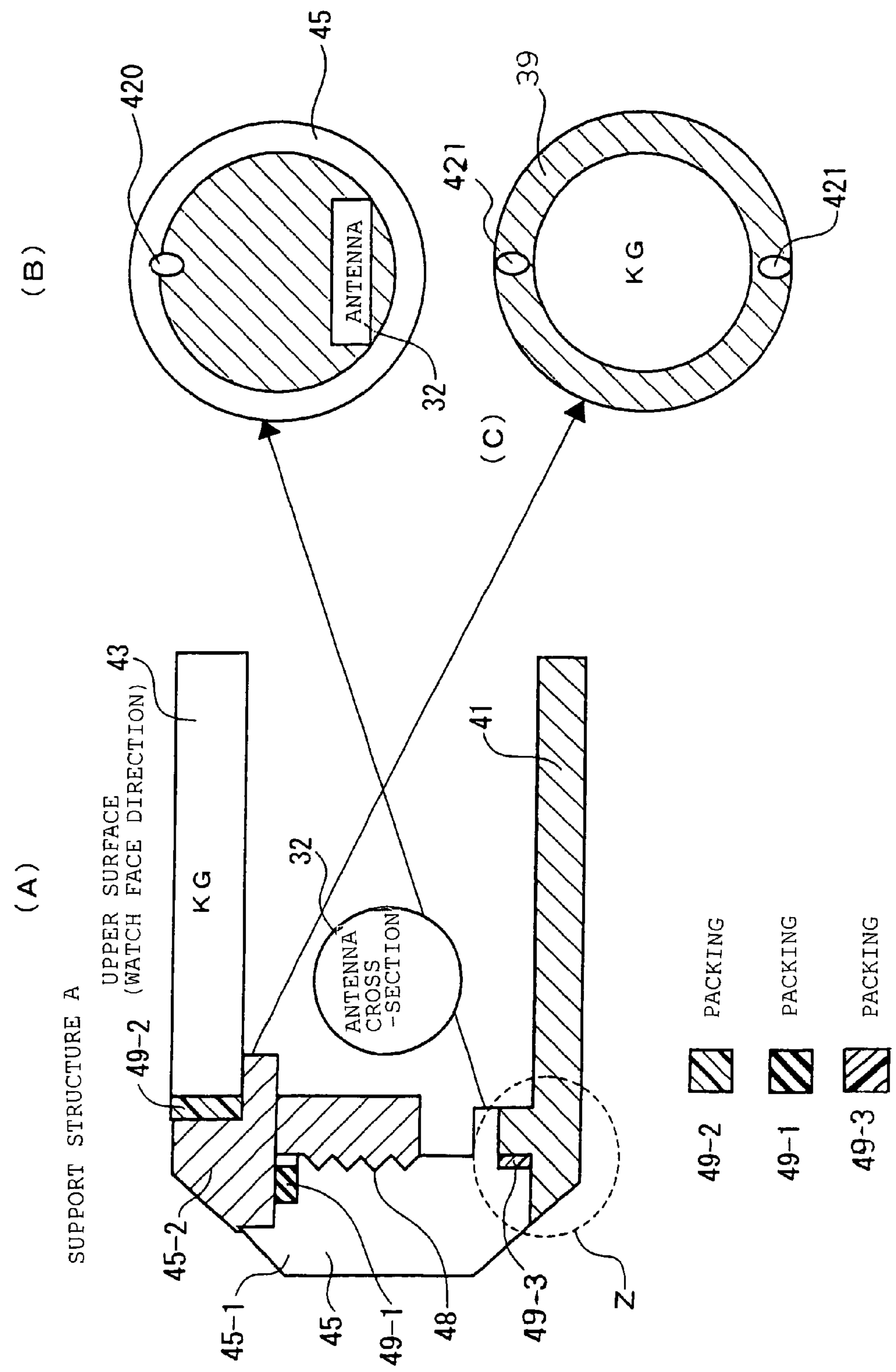
FIG. 10 is a drawing showing an example of the structure of the case body member and the caseback member in an electronic device according to the present invention.

In FIG. 10 (A), for example, the example shown is one in which the case body member 45 is divided into the members 45-1 and 45-2, these two being fixed by an appropriate screw means 48, via packing 49-1, wherein 49-2 is also packing.

The packing used in the present invention can be rubber packing, and can also be plastic packing.

FIG. 10 (B) shows an example in which, in the case of FIG. 10 (A), measures are taken with regard to static electricity by providing a mutual electrical conductivity by providing a silver past 420, for example, between part of the connecting region between the case body member 45 and the caseback member 41.

In this case, it is desirable that the silver paste 420 is provided at a position that is on the opposite the position of the antenna section 32.

In the Z part in FIG. 10 (A), in the case in which welding is done between the case body member 45 and the caseback member 41, it is desirable not to provide the welded part in the region of the antenna section 32. Also, in the case of joining using a method other than a method such as welding, soldering, or solid diffusion joining or the like, which do not allow breaking of the joining, the packing 49-3 is provided as shown in the part Z.

FIG. 10 (C) shows the example in which, in the case of FIG. 10 (A), fixing is down by packing via packing 49-2 between the case body member 45-2 and the wind shield 43, and tabs for opening and closing 421 are provided at minimally two locations.

The tabs 421 are required in the case of fixing by welding or the like between the case body member 45 and the caseback member 41 in order to open the inside from the case body member part side 45-2 for repair and the like.

Figure 11:
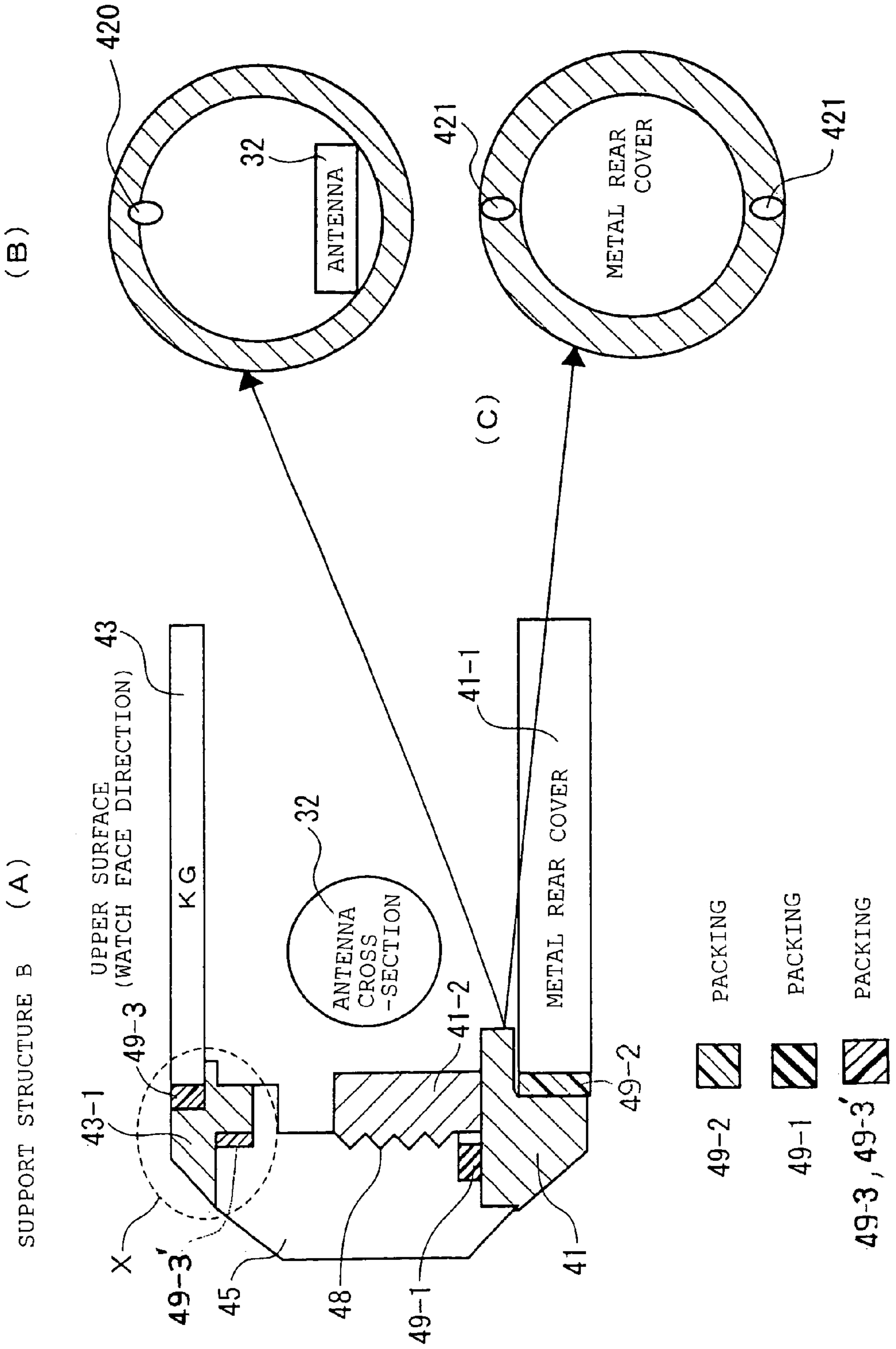
FIG. 11 is a drawing showing another example of the structure of the case body member and the caseback member in an electronic device according to the present invention.
Figure 12:
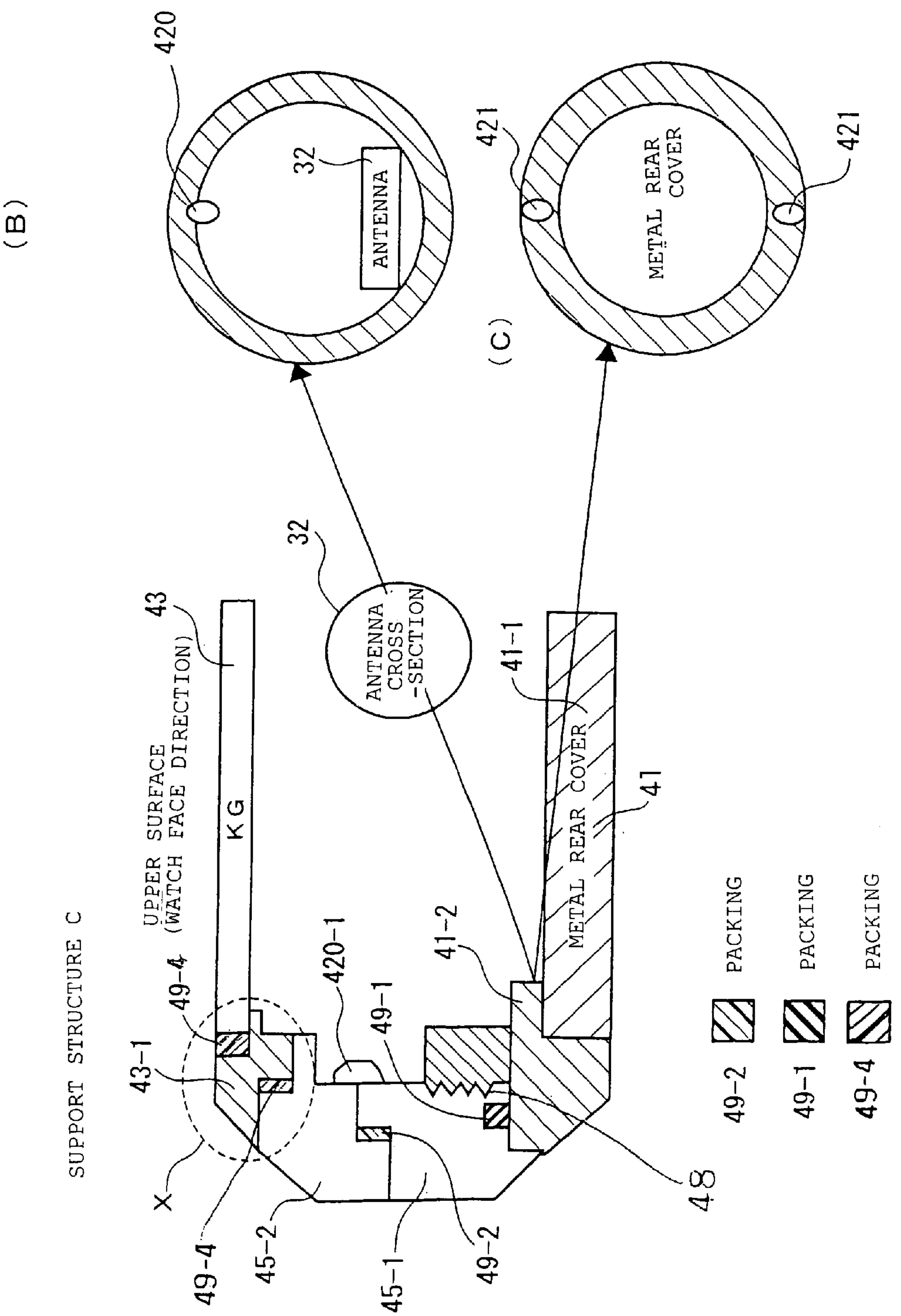
FIG. 12 is a drawing showing yet another example of the structure of the case body member and the caseback member in an electronic device according to the present invention.

Additionally, as shown in FIG. 11 and FIG. 12, there is no problem arising in the case in which at least one of the case body member 45 and the caseback member 41 is configured by a plurality of constituent elements and joining is done between the constituent elements using a joining method such as a welding method, a soldering method, a solid diffusion joining method or other method, and the joining also done between the case body member 45 and the caseback member 41 or a plurality of joining methods selected from a screw method, an internal screw method, a fixing method using a plurality of threaded bolts, a crimping method, a packing fixing method (including GN-4 or GN-7), a boss fitting fixing method, a snap-in method, and a bayonet method or the like is used.

For example, FIG. 11 (A) shows an example in which the caseback member 41 is formed by two constituent elements 41-1 and 41-2, these being mutually joined by a packing fixing method (including GN-4 or GN-7) via packing 49-2, wherein the case body member 45 and the caseback member 41 are fixed using an appropriate screw means 48 via packing 49-1.

The X part in FIG. 11 (A) shows the example in which an appropriate support member (a different constituent element of the case body member) 43-1 is welded to the case body member 45, wherein it is desirable that the welded part is not provided in the region around the antenna section 32. Also, in the case of joining using a method other than a method such as welding, soldering, or solid diffusion joining or the like, which do not allow breaking of the joining, packing 49-3' is provided as shown in the part X.

FIG. 11 (C) shows the example in which, in FIG. 11 (A), in removable fixing the caseback member 41 and the case body member 45, tabs 421 for opening and closing are provided at minimally two locations.

FIG. 11 (B) shows the example in which, in FIG. 11 (A), silver paste 420 is provided at a part of the connecting region between the caseback members 41-1 and 41-2, so as to provide mutually conductivity as a measure against static electricity.

In this case, it is desirable not to provide the silver paste 420 at a location opposite a location at which the antenna section 32 is disposed.

FIG. 12 (A) shows the example in which the case body member 45 is formed by two constituent elements 45-1 and 45-2, which are appropriately joined using packing 49-2, joining being made to the caseback member 41, formed by the solid diffusion joining of the constituent elements 41-1 and 41-2, via packing 49-1 using an appropriate screw means 48.

The X part in FIG. 12 (A) shows the example in the case in which an appropriate support member (a different constituent element of the case body member) 43-1 is welded to the case body member 45, wherein it is desirable that the welded part is not provided in the region around the antenna section 32. Also, in the case of joining using a method other than a method such as welding, soldering, or solid diffusion joining or the like, which do not allow breaking of the joining, packing 49-4 is provided as shown in the part X.

FIG. 12 (C) shows the example in which, similar to FIG. 11 (C), tabs 421 for opening and closing are provided at minimally two locations.

FIG. 12 (B) shows the example in which, in FIG. 12 (A), silver paste 420 is provided at a part of the connecting region between the caseback members 41-1 and 41-2, so as to provide mutually conductivity as a measure against static electricity.

In this case it is desirable not to provide the silver paste 420 at a location opposite a location at which the antenna section 32 is disposed.

FIG. 12 (A) shows the example in which silver paste 420 is provided at the connecting region between constituent elements 45-1 and 45-2 of the case body member 45, so as to provide mutually conductivity as a measure against static electricity.

In this case, because the means for joining the constituent elements 45-1 and 45-2 of the case body member 45 must not allow breaking of the joined location, if packing 49-2 such as shown in the joining location in FIG. 12 is provided, it is desirable that an appropriate adhesive be used for joining and fixing, and in the case in which packing 49-2 is not provided at the joining location, it is possible, for example, to used a welding means at the joining location.

When breaking the fixing in the case body member or the caseback member, it is sufficient to provide a member for the purpose of breaking the fixing in the location to be attached and removed (for example, if a tool is to be used in breaking the fixing, a depression, such as the tab parts shown in FIG. 10 through FIG. 12, to accommodate the tool for this member is preferably provided at a position corresponding to the tool of the member). On the other hand, in a case in that the member is provided with the location not to be attached and removed it is better to provide a marking indicating that attachment and removal is not possible (for example, not providing a depression for fitting of a tool in this member, or providing a depression at only one location, so that the tool cannot be fitted).

It is desirable to use rubber (for example, fluorine based resin), Teflon (registered trademark), or a metal (for example, stainless steel) or the like as the packing.

In the case as well in which the case body member or the caseback member is formed by a plurality of constituent elements, it is desirable that the joining and fixing portion 400 not be provided in the vicinity of the antenna section.

A specific example of the joining and fixing portion 400 in the present invention is described in detail below, with reference made to FIG. 7.

Figure 7:
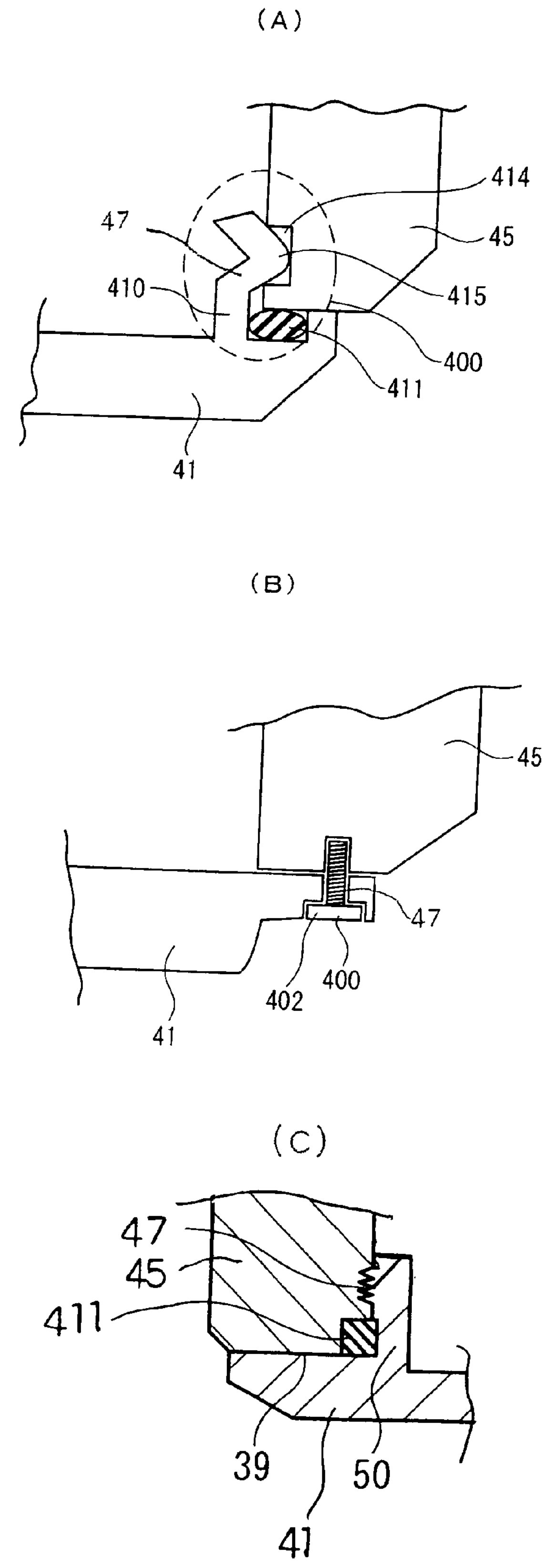
FIG. 7 is a cross-sectional view describing a specific example of the joining and fixing portion in a metal outer case according to the present invention.

Specifically FIG. 7 (A) presents cross-sectional views showing a specific example of the configuration of the joining and fixing portion 400 according to the present invention, and an example of adopting a boss fixing method, and a plurality of joining and fixing portions 400 having the same configuration as shown in FIG. 7 (A) being provided at prescribed locations on the connecting region 39 formed between the case body member 45 and the caseback member 41 of the metal outer case of the electronic device 30.

Specifically, in this drawing a plurality of bosses 410 are provided on the caseback member 41 and the projected portion 415 of the bosses 410 being caused to fit into a groove part 414 provided in the case body member 45, the case body member 45 and the caseback member 41 being fixed as necessary with an intervening packing 411.

In this drawing, although 415 indicates an internal boss biting fixing method, it is possible to used an external boss biting fixing method having a structure that is the reverse of the internal boss biting fixing method.

FIG. 7 (B) is a cross-sectional view showing an example of using a threaded bolt member 402 as the joining and fixing portion 400, in which a plurality of threaded bolts 402 are provided at prescribed positions on the connecting region 39 formed between the case body member 45 and the caseback member 41 in the radio controlled timepiece 30.

Additionally, FIG. 7 (C) shows an example of using an internal thread method as the joining means 47 of the connecting region 400.

As the metallic material forming the metal outer case 31 used in the present invention, it is not restricted to a specific metal material but it is possible to use one or a plurality of types of materials selected from the group consisting of stainless steel, titanium, a titanium alloy, gold, a gold alloy, silver, a silver alloy, copper, a copper alloy, brass, aluminum, an aluminum alloy, zinc, a zinc alloy, magnesium, a magnesium alloy, and a super-hard metal (an alloy including tungsten-carbide and tantalum-carbide or the like).

Although omitted from this description, in the case of performing receiving characteristics tests similar to those noted above using the above-noted materials, although there are some small differences in values and the shape of the graphs, it was verified that there were no problems in terms usability as a product.

Next, yet another specific example of the present invention is described below, with references being made to FIG. 13 and FIG. 14.

Figure 13:
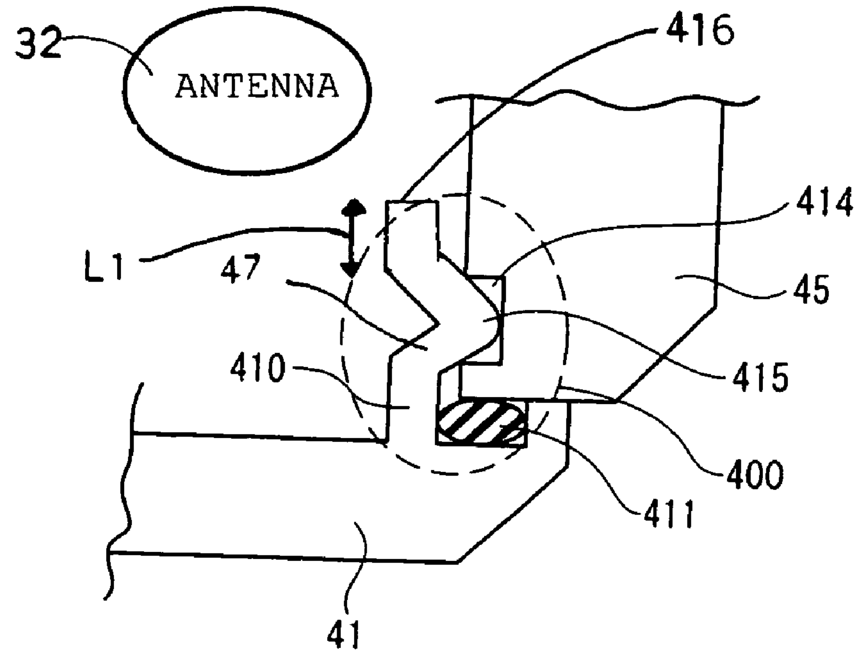
FIG. 13 is a drawing showing still another example of the structure of the case body member and the caseback member in an electronic device according to the present invention.
Figure 13:
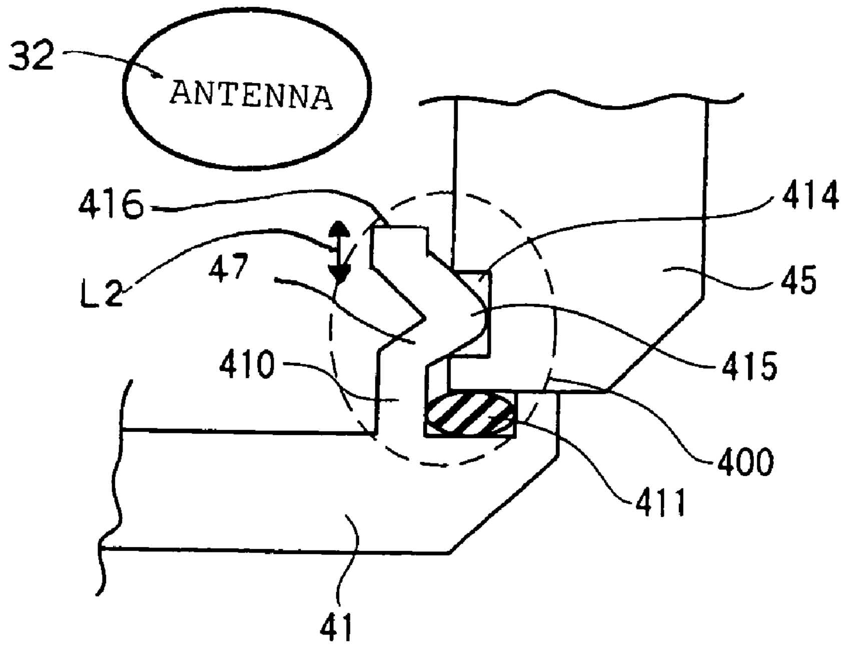

Specifically, FIG. 13 shows that, in the configuration of FIG. 7 (A) in which an internal boss biting fixing means is used as the joining means 47 of the fixing part 400, there is a change in the receiving characteristics with a change as well if the length L of the upper edge part 416 of the boss part 410 is varied.

Specifically, if a comparison is made between the case, as shown in FIG. 13 (A), in which the length L1 of the upper edge part 416 of the boss part 410 is made long, and the case in which, as shown in FIG. 13 (B), in which the length L2 of the upper edge part 416 of the boss part 410 is made shorter than that of the above-noted L1, it was discovered that the boss structure shown in FIG. 13 (B) has improved receiving characteristics, compared to the boss structure of FIG. 13 (A).

The reason for this is thought to be that, in the case having the boss structure shown in FIG. 13 (B), compared to the boss structure shown in FIG. 13 (A), there is more separation between the upper edge part 416 of the boss part 410 and the antenna section 32, or that the boss structure shown in FIG. 13 (B), compared to the boss structure shown in FIG. 13 (A), has less possibility that there will be contact between the upper edge part 416 of the boss part 410 and the case body member 45, thereby suppressing the generation of eddy currents that hinder the antenna resonance phenomenon.

Figure 14:
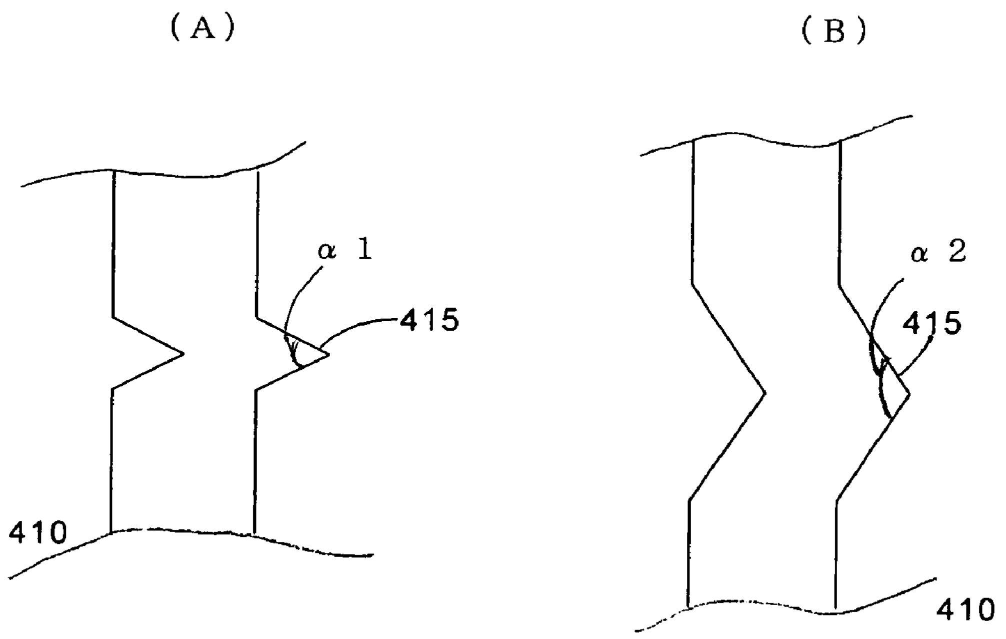
FIG. 14 is a drawing showing a still different example of the structure of the case body member and the caseback member in an electronic device according to the present invention.

As yet another example in the present invention, as shown in FIG. 14, in a configuration in which an internal boss biting fixing means is used as the joining means 47 of the fixing part 400 shown in FIG. 7 (A), it was discovered that by changing the angle of the protrusion 415 of the boss part 410, the receiving sensitivity of the antenna changes.

Specifically, if a comparison is made between the case, as shown in FIG. 14 (A), in which the angle α1 of the protrusion 415 of the boss part 410 is set to be relatively small, and the case, as shown in FIG. 14 (B), in which the angle α2 of the protrusion 415 of the boss part 410 is set to be larger than the angle α1 noted above, it was discovered that the case having the large angle α2 shown in FIG. 14 (B) had improved antenna sensitivity over the case of the small angle α1 shown in FIG. 14 (A).

The reason for this is thought to be that, when the case in which the angle α2 of the protrusion 415 of the boss part 410 is large, as shown in FIG. 14 (B), is compared to the case in which the angle α1 of the protrusion 415 of the boss part 410 is small, as shown in FIG. 14 (A), because the holding force of the boss part 410 with respect to the case body member 45 is small, there is suppression of the generation of eddy currents, which hinder the antenna resonance phenomenon.

By adopting the constitution described above, the present invention solves the above-noted problems in the prior art, providing an electronic device that has good receiving efficiency, without greatly changing the structure, the outer case material, or the design of an electronic device, including a radio controlled timepiece of the past, adopting an antenna section having a simple configuration, enabling the achievement of an electronic device without any difference in size and thickness relative to an electronic device of the past, and providing an improvement in the degree of freedom in design and enabling the lowering of the manufacturing cost.

Because an electronic device according to the present invention adopts the above-noted technical constitution, by specifying the position of displacement of the joining and fixing portions, it is possible to achieve a further improvement in the gain of the antenna section disposed within a metal outer case as in the past, and possible to manufacture a lightweight, compact, and thin electronic device.

What is claimed is:

1. An electronic device minimally comprising an antenna section, an information processing means for processing information that is captured by said antenna section, and a metal outer case, which houses therewithin said antenna section and said information processing means, wherein said metal outer case is configured so that said antenna section can receive magnetic flux from outside via said metal outer case and can resonate, said metal outer case minimally comprising a metal case body member and a metal caseback member, and further wherein a joining and fixing portion formed between said metal case body member and said metal caseback member where both of said members being fixedly joined to each other is not provided at least at a location or in the vicinity of said location within a connecting region in which said metal case body member and said metal caseback member are closely attached to each other, and which is opposite to a substantially center part of said antenna section;

said antenna section is disposed in the vicinity of the outer periphery of said metal outer case;

said joining and fixing portion is not provided in at least one of:

(1) an area within said connecting region in that said metal case body member and said metal caseback member are closely attached to each other, and which is formed between lines joining the ends of said antenna section with the center point of said electronic device;

(2) an area within said connecting region in that said metal case body member and said metal caseback member are closely attached to each other, and which is formed between lines joining the ends of an antenna coil section of said antenna section with the center point of said electronic device; and (3) an area within said connecting region in that said metal case body member and said metal caseback member are closely attached to each other, and which is formed between interconnection portions formed between a center axis line of said antenna section, which is substantially straight, and said connecting region, and which is closer to said antenna section.

2. An electronic device according to claim 1, wherein at least one of said case body member and said caseback member is formed by a plurality of constituent elements.

3. An electronic device according to claim 1 or 2, wherein said electronic device is a one selected from a group consisting of at least a radio controlled timepiece, a mobile telephone, and a radio communication device.

4. An electronic device according to claim 1 or 2, wherein a configuration of said joining and fixing portion shown in said connecting region is a spot like shape.

5. An electronic device according to claim 1 or 2, wherein a plurality of said joining and fixing portions are provided within said connecting region, which is surrounding said electronic device.

6. An electronic device according to claim 5, wherein the number of said joining and fixing portions is selected as one from the range two to six.

7. An electronic device according to claim 1 or 2, wherein said joining and fixing portion fixedly joins said caseback member and said case body member by a one or more fixing means selected from a group consisting of a screw method, an internal screw method, a fixing method using a plurality of threaded bolts, a crimping method, a packing fixing method, a boss biting fixing method, a snap-in method, a welding method, a soldering method, a bayonet method, and a solid diffusion joining method, or the like.

8. An electronic device according to claim 1 or 2, wherein said metal outer case is made from a material that is one or a plurality of types selected from the group consisting of stainless steel, titanium, a titanium alloy, gold, a gold alloy, silver, a silver alloy, copper, a copper alloy, brass, aluminum, an aluminum alloy, zinc, a zinc alloy, magnesium, a magnesium alloy, and a super-hard metal (an alloy including tungsten-carbide and tantalum-carbide).

9. An electronic device according to claim 1 or 2, wherein said antenna section comprises a magnetic core that is rod-shaped and is substantially straight or curved, with a maximum length that is smaller than the maximum diameter length of said metal outer case.

* * * * *